United States Patent
Mueller et al.

(10) Patent No.: US 9,082,188 B2
(45) Date of Patent: Jul. 14, 2015

(54) OPTICAL TOPOGRAPHIC IMAGING

(75) Inventors: Horst Arnold Mueller, Rio Rancho, NM (US); Ryan Eric Martin, Tijeras, NM (US); Robert K. Rowe, Corrales, NM (US)

(73) Assignee: HID GLOBAL CORPORATION, Austin, TX (US)

(*) Notice: Subject to any disclaimer, the term of this patent is extended or adjusted under 35 U.S.C. 154(b) by 396 days.

(21) Appl. No.: 13/443,534

(22) Filed: Apr. 10, 2012

(65) Prior Publication Data

US 2012/0257046 A1    Oct. 11, 2012

Related U.S. Application Data

(60) Provisional application No. 61/473,860, filed on Apr. 11, 2011.

(51) Int. Cl.
*H04N 7/18* (2006.01)
*G06T 7/00* (2006.01)
*G06K 9/00* (2006.01)

(52) U.S. Cl.
CPC .......... *G06T 7/0073* (2013.01); *G06K 9/00013* (2013.01); *G06K 9/00033* (2013.01); *G06T 2207/10152* (2013.01)

(58) Field of Classification Search
CPC .. H04N 7/181; G06T 7/0073; G06K 9/00033; G06K 9/00013; G06K 9/00046; G06K 9/2018; G06K 9/0012
USPC ........................................................ 348/135
See application file for complete search history.

(56) References Cited

U.S. PATENT DOCUMENTS

| | | | |
|---|---|---|---|
| 7,352,892 B2 * | 4/2008 | Zhang et al. ................. | 382/154 |
| 2001/0050765 A1 | 12/2001 | Antonelli et al. | |
| 2006/0002598 A1 * | 1/2006 | Rowe et al. ................... | 382/124 |
| 2006/0110015 A1 * | 5/2006 | Rowe ............................. | 382/124 |
| 2006/0210120 A1 * | 9/2006 | Rowe et al. ................... | 382/115 |
| 2006/0269111 A1 * | 11/2006 | Stoecker et al. ............. | 382/128 |

(Continued)

OTHER PUBLICATIONS

Quality and matching performance analysis of three-dimensional unraveled fingerprints, Wang et al., Optical Engineering 49(7), 077202, Jul. 2010.*

(Continued)

*Primary Examiner* — Jay Patel
*Assistant Examiner* — Francis G Geroleo
(74) *Attorney, Agent, or Firm* — Marsh Fischmann & Breyfogle LLP; Kent A. Fischmann (57) ABSTRACT

Methods and devices of studying a predefined portion of an object having a feature of interest are disclosed. The feature of interest defines a class of objects that includes the object. Light sources directly illuminate the object from different illumination directions. The light sources are maintained in a stable configuration relative to the object. For each illumination direction, an image is generated from light scattered from the object with a camera maintained in a stable configuration relative to the light sources. A methodology derived from machine learning for the class of objects is applied to filter the generated images are filtered for a characteristic consistent with the feature of interest. Surface gradients are determined from the filtered images and integrated to generate a topography of a surface of the object.

23 Claims, 6 Drawing Sheets

(56) References Cited

U.S. PATENT DOCUMENTS

| | | | |
|---|---|---|---|
| 2007/0030475 A1* | 2/2007 | Rowe et al. | 356/71 |
| 2008/0298649 A1* | 12/2008 | Ennis et al. | 382/125 |
| 2009/0046903 A1* | 2/2009 | Corcoran et al. | 382/124 |
| 2009/0148005 A1* | 6/2009 | Rowe | 382/115 |
| 2009/0154792 A1* | 6/2009 | Sun et al. | 382/154 |
| 2009/0245591 A1* | 10/2009 | Rowe et al. | 382/115 |
| 2009/0315989 A1* | 12/2009 | Adelson | 348/135 |
| 2010/0067748 A1 | 3/2010 | Rowe | |
| 2010/0246902 A1* | 9/2010 | Rowe et al. | 382/115 |
| 2010/0284596 A1 | 11/2010 | Miao et al. | |
| 2010/0289878 A1 | 11/2010 | Sato et al. | |

OTHER PUBLICATIONS

Chikkerur, Sharat S. Online Fingerprint Verification System. State University of New York at Buffalo. pp. 1-105. Jun. 2005. <URL: http://citeseerx.ist.psu.edu/viewdoc/download?doi=10.1.1.90.858&rep=rep1&type=pdf>.

Applicant: Lumidigm, Inc. Notification of Transmittal of the International Search Report and the Written Opinion of the International Searching Authority, or the Declaration. International Application No. PCT/US2012/033118. International Filing Date: Apr. 11, 2012.

* cited by examiner

OPTICAL TOPOGRAPHIC IMAGING

CROSS-REFERENCE TO RELATED APPLICATION

This application is a nonprovisional of, and claims the benefit of the filing date of, U.S. Prov. Pat. Appl. No. 61/473,860, entitled "OPTICAL TOPOGRAPHIC IMAGING," filed Apr. 11, 2011, the entire disclosure of which is incorporated herein by reference in its entirety.

BACKGROUND OF THE INVENTION

This application relates generally to optical imaging. More specifically, this application relates to optical topographic imaging.

There are a variety of applications in which it is desirable to study an object in order to analyze its topographical features. One particular example is fingerprint imaging, in which the topographical pattern of ridges is commonly used in identification applications, either to provide a mechanism for identifying a person from fingerprints or to verify a purported identity of a person based on that person's fingerprints.

Most fingerprint-collection methods that are currently used rely on measuring characteristics of the skin at or very near the surface of a finger. In particular, optical fingerprint readers typically rely on the presence or absence of a difference in the index of refraction between a sensor platen and skin tissue placed on it. When an air-filled valley of the fingerprint is above a particular location of the platen, total internal reflectance ("TIR") occurs in the platen because of the air-platen index difference. Alternatively, if skin of the proper index of refraction is in optical contact with the platen, the TIR at this location is frustrated, allowing light to traverse the platen-skin interface. A map of the differences in TIR across the region where the finger is touching the platen forms the basis for a conventional optical fingerprint reading. There are a number of optical arrangements used to detect this variation of the optical interface in both bright-field and dark-field optical arrangements. Commonly, a single quasimonochromatic beam of light is used to perform this TIR-based measurement.

There also exist other optical fingerprint sensors that do not rely on this TIR-based measurement. In most cases, such sensors rely on some arrangement of quasimonochromatic light to illuminate the front, sides, or back of a fingertip, causing the light to diffuse through the skin. The fingerprint image is formed from differences in light transmission across the skin-platen boundary for the ridge and valleys. The differences in optical transmission are due to changes in the Fresnel reflection characteristics that result from the presence or absence of any intermediate air gap in the valleys.

Another example of in which imaging is used to analyze topographical features are in the deployment of machine-readable symbols that are incorporated directly onto parts being marked as part of supply-chain monitoring systems. The symbols are used to improve supply-chain management by marking parts with unique symbols having topographic features formed by such techniques as laser etching, chemical etching, dot peening, casting, machining, and other operations. The ability to image, and thereby read, the unique symbols is fundamental to the operation of monitoring the transfer of parts and materials through supply chains. Such symbols are referred to herein as "machined barcodes," but such terminology is not intended to limit the manner in which the symbols are formed.

SUMMARY

Embodiments of the invention provide methods of studying a predefined portion of an object having a feature of interest that defines a class of objects that includes the object. Each of a plurality of light sources directly illuminate the object from a different illumination direction. The plurality of light sources is maintained in a stable configuration relative to the object. For each illumination direction, an image is generated from light scattered from the object with a camera maintained in a stable configuration relative to the plurality of light sources. A methodology derived from machine learning for the class of objects is applied to filter the generated images for a characteristic consistent with the feature of interest. Surface gradients for the object are determined from the filtered images. The surface gradients are integrated to generate a topography of a surface of the predefined portion of the object.

In some embodiments, an albedo of the object may also be determined from the generated images.

When the predefined portion of the object is approximately planar, filtering the generated images may comprise applying a band-pass filter to the generated images. When the feature of interest comprises an orientation, filtering the generated images may comprise applying an orientation filter to the generated images. When the feature of interest comprises a chromatic characteristic, filtering the generated images may comprise applying a chromatic filter to the generated images.

The process for determining the surface gradients may band-pass comprise applying a deconvolution to the generated images to account for anisotropic scattering of light by a bulk component of the object. In some instances, a different processing is applied to each of the generated images. The surface gradients may, in particular, be extracted through application of periodic factors generated as a function of a geometry defined by positions of the plurality of light sources relative to the object. Those periodic factors may, in some instances, be determined with a machine-learning process.

The topography of the surface of the object may be defined by a topographic image, to which a transformation may be applied for certain effects. For example, the transformation may change a contrast of the topographic image, may reduce artifacts due to specular light within the topographic image, or may binarize the topographic image. These transformations may, moreover, also be determined with a machine-learning process.

The light sources may be substantially monochromatic sources, such as when each of the light sources generates light at substantially the same wavelength. The light sources may be distributed about the object at substantially the same elevation and be distributed substantially uniformly in azimuth relative to the object. in some instances, portions of the object are in optical contact with a platen that is substantially transparent to light generated by the light sources.

In other embodiments, the light sources provide light at a plurality of wavelengths so that determining the surface gradients comprises determining the surface gradients at each of the plurality of wavelengths. This may occur in embodiments where at least some of the light sources comprise polychromatic light sources. Such embodiments are also useful when an albedo of the surface of the object is determined from the generated images at each of the plurality of wavelengths so that the determined albedo at the plurality of wavelengths may be compared to determine an authenticity of the object as a biometric sample.

The light sources may be sequentially activated to directly illuminate the object. In other embodiments, the object is illuminated by simultaneously activating at least some of the light sources in a pattern to determine a response to individual light sources with a transform. Shadow effects may be handled by regionally modifying at least one of the generated images to exclude a shadowed portion of the object study.

The object may comprise any of a variety of objects, examples of which include biometric samples and machined barcodes.

These methods of the invention may also be embodied in a device for studying an object. The device comprises a plurality of light sources, a camera, and a computational unit in communication with the plurality of light sources and with the camera. The light sources are disposed to provide illumination of the object from different illumination directions and the camera is disposed to receive light scattered from the object. The computational unit has instructions to implement the methods as described above.

BRIEF DESCRIPTION OF THE DRAWINGS

A further understanding of the nature and advantages of the present invention may be realized by reference to the remaining portions of the specification and the drawings, wherein like reference labels are used through the several drawings to refer to similar components.

DETAILED DESCRIPTION OF EXEMPLARY EMBODIMENTS

Embodiments of the invention are directed generally to methods and devices that use optical topographic imaging for imaging an object. These methods and devices find a variety of applications that include fingerprint and machined-barcode imaging among others. While the description that follows sometimes makes specific reference to fingerprint and/or machined-barcode imaging for purposes of illustration, this is not intended to be limiting. More generally, the methods and devices of the invention may be used with any object that has topographical features that are of interest. For example, other parts of the hand (such as the palm) or other body parts may be imaged by the methods and devices described herein. Measurements of a variety of manufactured goods, such as surface finishes of cast or machined parts may be performed. Scratches and other forensic details from bullets and other such objects may also be gathered using the methods and devices described herein.

It is specifically noted that the phrase "optical topographic imaging" is also not intended to be limiting. Indeed, the techniques and methodologies disclosed herein allow the extraction not only of topographical features but also other features of the imaged portion of the object that include reflectance features such as albedo and chromaticity, among others. In some instances, only the topographical information is used, but in other cases, a combination of topographic and other information is used. Some of these applications are discussed specifically below.

Figure 1A:
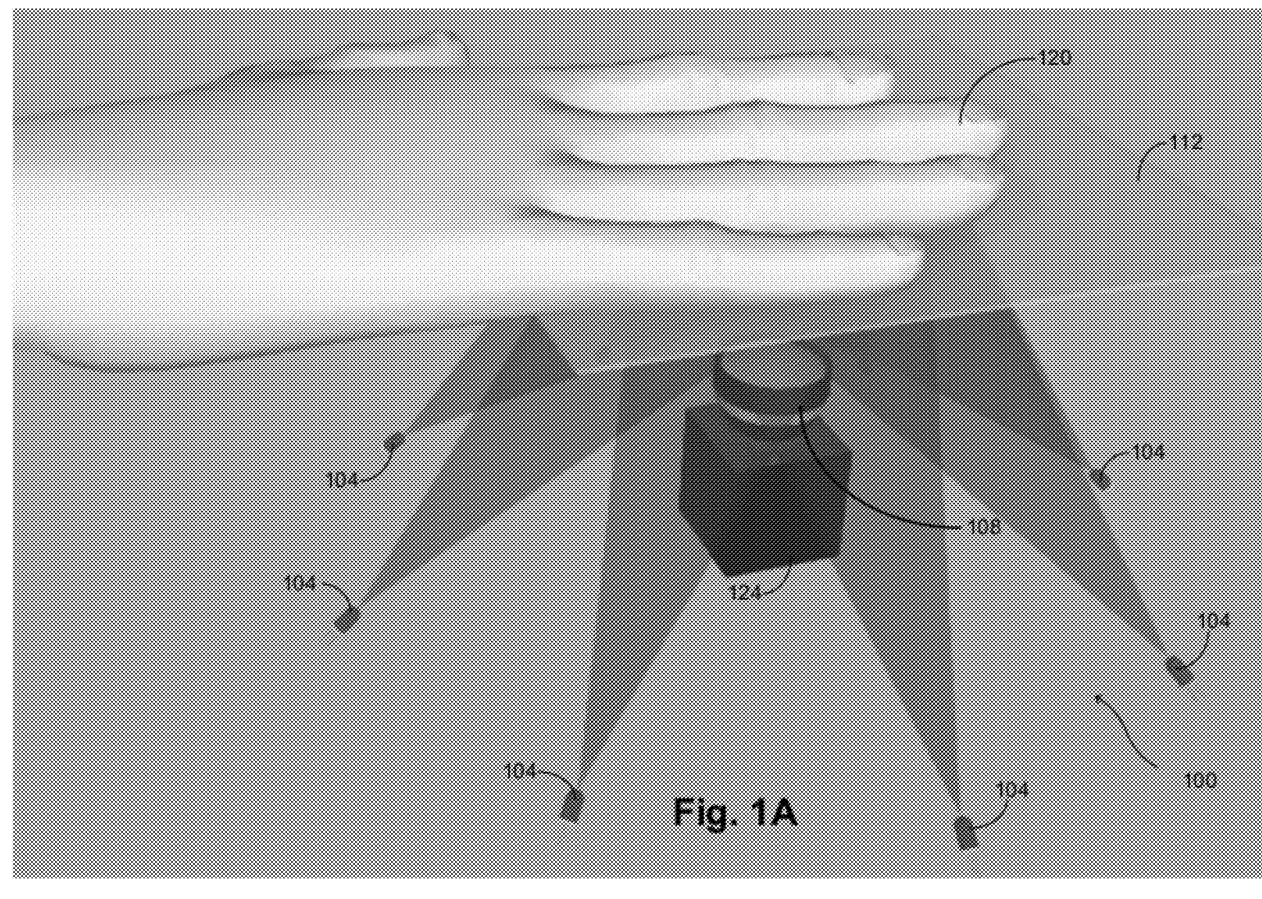
FIG. 1A illustrates a general configuration of an optical topographic imaging device according to embodiments of the invention.

An illustration of the structure of a device that may be used to implement optical topographic imaging is provided with FIG. 1A. This drawing is highly schematic and is intended to illustrate the direct collection of multiple images taken at different illumination angles. In actual implementation, the different components shown in the drawing may be packaged into a single unit; the drawing shows internal components of such a package.

The device 100 comprises a plurality of light sources 104, each of which may be implemented as a substantially monochromatic light source using, for example light-emitting devices ("LEDs") or laser diodes ("LDs"). Substantially monochromatic light may alternatively be generated using narrowband or broadband sources with appropriate optical-filter elements. Light from the sources 104 is directed to a platen 112 that is transparent at at least the wavelength of the sources so that the object 120 may be illuminated. The illuminated object is imaged with a camera 108, which may comprise a digital camera. A computational unit 124 is provided in communication with the camera 108 and with the light sources 104, and is configured to operate the device 100 and to analyze collected data. "Direct" collection of the images means that each of the images collected by the camera 108 are not limited to areas in which the object 120 is in optical contact with the platen 112 but additionally includes other areas of the object 120. Indeed, in some embodiments, the platen 112 may be omitted, its presence being primarily to guide positioning of the object 120 for imaging.

The light sources 104 are generally disposed to provide different angles of illumination and may, in some embodiments, be disposed circumferentially about a circle in a plane substantially parallel to the platen 112. In some instances, the sources 104 are disposed uniformly about the circle, i.e. in an azimuthally uniform distribution, but in other embodiments the dispositions may be nonuniform. When the sources 104 are disposed about the entirety of the circle, they may provide 360° interrogation of the object 120, but in other embodiments, only a portion of a circle might be provided with coverage, such as when the positions of the light sources 120 define a semicircle.

It is generally expected that the device 100 is deployed under circumstances in which the camera 108 and the object 120 are substantially stationary relative to each other, and in which the light sources are illuminated in a fixed sequence during imaging. The same imaging principles may be applied in other circumstances where relative motion between the object 120 and the camera 108 may be mathematically accounted for. Because the arrangement has a fixed geometry that defines the illuminators and illumination sequence, the imager, and the sample plane, particular devices 100 may be calibrated using a variety of techniques that include analysis of previously acquire optical-topographic-imaging data. Such calibrations may then advantageously be applied to future measurements with the particular device. This is described further below and is related to the ability of the imaging techniques to make use of machine-learning algorithms. In particular, because the device 100 is used generally to image a known and limited class of samples that have similar optical characteristics (such as fingerprints), previously collected datasets may be used to derive rules, coefficients, features, relationships, and other aspects of the imaging. These various quantifications can be analyzed and refined using machine-learning algorithms to enhance the analysis of different objects under study. Other imaging techniques that consider the general case of an arbitrary object, such as being configured to determine the geometry and albedo of objects that do not necessarily share similar optical characteristics, are much more limited in the potential for machine learning.

The relative disposition of the light sources 104 with the platen 112 provides for near-field illumination of the object 120. This may cause the illumination intensity and the illumination angle to vary across the object plane as defined by the platen 112. Illumination intensity variation may be corrected through flat-fielding if desired, and it is believed that variation of illumination angle may be partially compensated for by symmetric system design.

In some instances, the object 120 may be imaged when it is in nominal contact with the platen 112. This is particular the case in biometric embodiments where the object 120 comprises a finger, a palm, or the like. In embodiments where there is such contact, the object may advantageously be considered to be approximately planar, enabling filtering to be applied in the raw image space rather than in the integrated space. In addition, the angle of illumination striking the object 120 will generally change at the points of optical contact because of refraction differences at object-platen boundaries as compared with object-air boundaries.

Figure 1B:
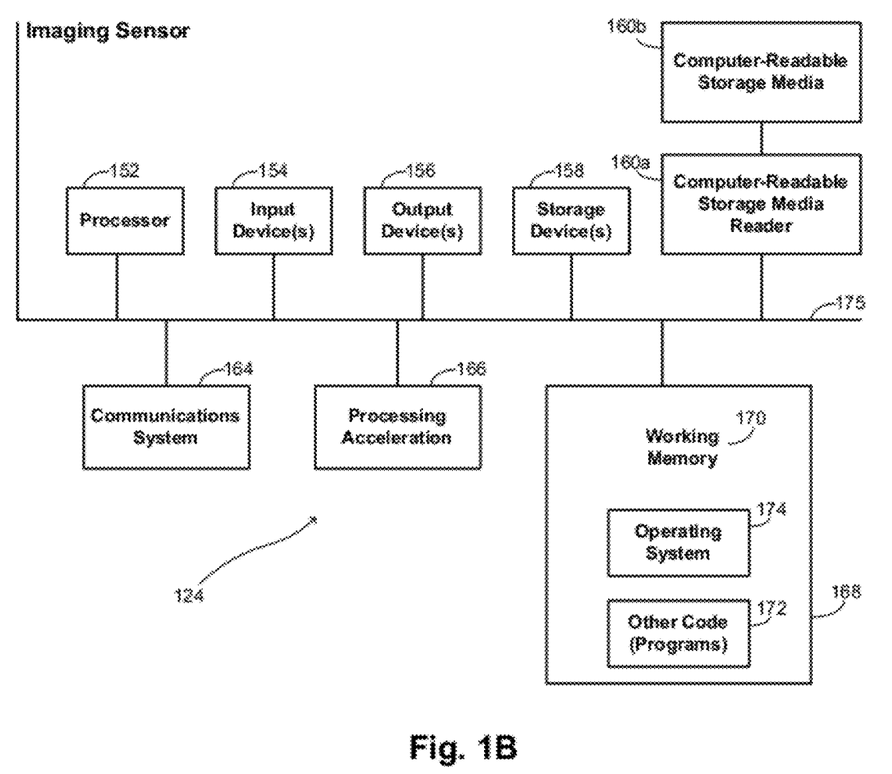
FIG. 1B is a schematic representation of a computer system that may be used to manage functionality of the optical topographic imaging device of FIG. 1A.

A schematic illustration of the computational unit 124 is provided with FIG. 1B, which broadly illustrates how individual elements may be implemented in a separated or more integrated manner. The computational unit 124 may form part of the device 100 itself, packaged with the other elements, or may be provided separately. It is shown comprised of hardware elements that are electrically coupled via bus 175. The hardware elements include a processor 152, an input device 154, an output device 156, a storage device 158, a computer-readable storage media reader 160a, a communications system 164, a processing acceleration unit 166 such as a DSP or special-purpose processor, and a memory 168. The computer-readable storage media reader 160a is further connected to a computer-readable storage medium 160b, the combination comprehensively representing remote, local, fixed, and/or removable storage devices plus storage media for temporarily and/or more permanently containing computer-readable information. The communications system 164 may comprise a wired, wireless, modem, and/or other type of interfacing connection and permits data to be exchanged with external devices.

The computational unit 124 also comprises software elements, shown as being currently located within working memory 170, including an operating system 174 and other code 172, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

Figure 2:
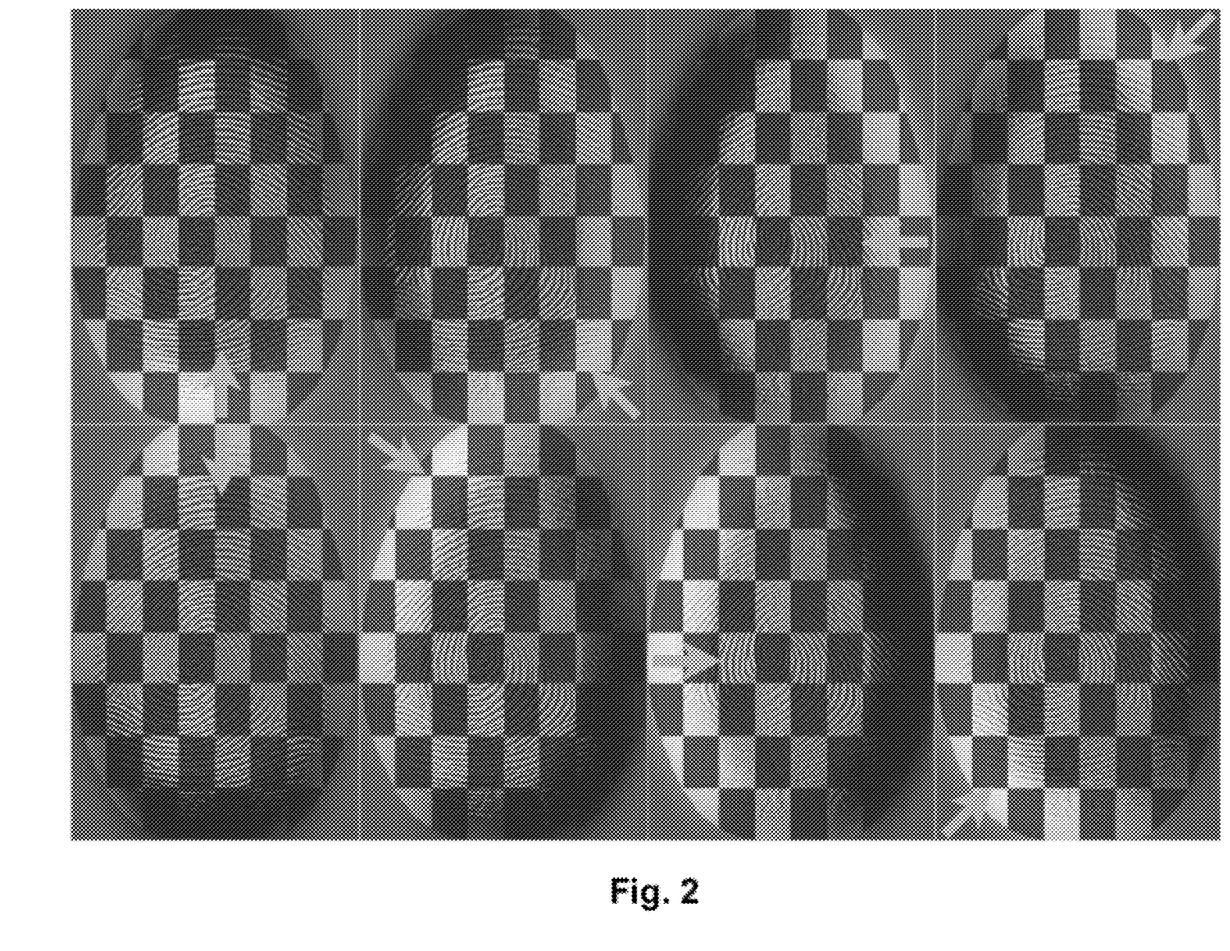
FIG. 2 provides a series of images that illustrate the effect of topographical features such as surface shape and reflectance on images of an object for different illumination angles.

To illustrate the effect of illuminating the object 120 at different illumination angles, FIG. 2 shows eight images of a test object. The object corresponds to a biometric fingerprint having a three-dimensional shape to which reflectance differences have been added to follow the surface as illustrated by the checkered pattern. The different panels in the drawing correspond to images produced with different azimuth illumination directions for an elevation angle of 45° and an azimuth angle of 45°. The surface shape and reflectance cause different effects in the image as the illumination angle changes, allowing different kinds of information to be extracted. While the same general effect is seen when imaging various kinds of objects, individual objects may have different levels of optical complexity. Salient optical effects for biometric objects include diffuse surface reflections, subsurface or bulk scattering, specular reflections, and polychromatic albedo.

Figure 3A:
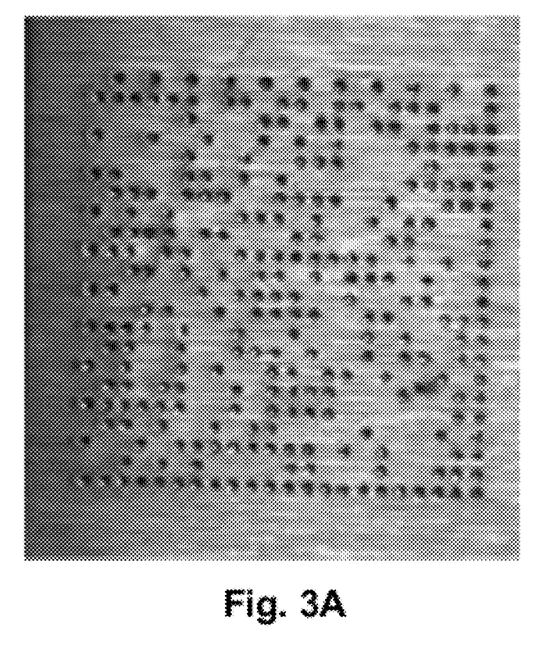
FIGS. 3A and 3B provide examples of machined barcodes.
Figure 3B:
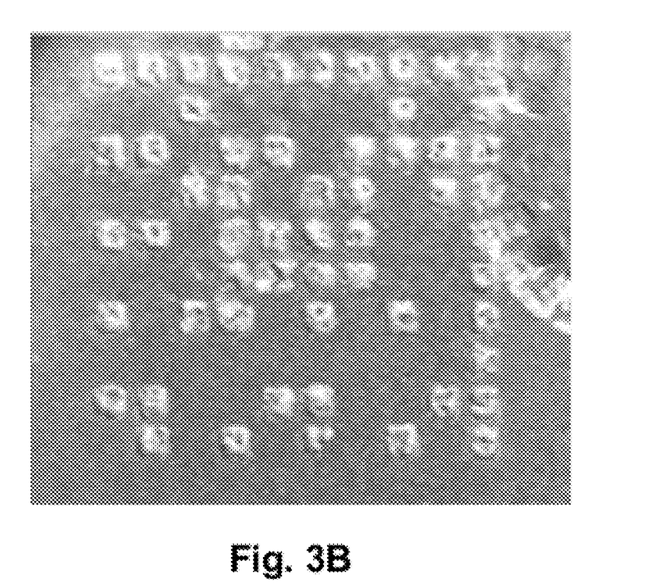

While the typical biometric object is optically complex, other test objects may be relatively simple optically. An example is machined barcodes, examples of which are provided in FIGS. 3A and 3B for purposes of illustration. FIG. 3A shows an example of a machined barcode created using a dot-peening process so that the barcode is manifested through small depressions in a metal substrate. FIG. 3B shows another example in which the machined barcode was created using spot welds. This particular example is of interest because the elements generated from spot welds are at times poorly formed, but the methods and systems of the invention are still able to image and interpret the machined barcode accurately.

Figure 4:
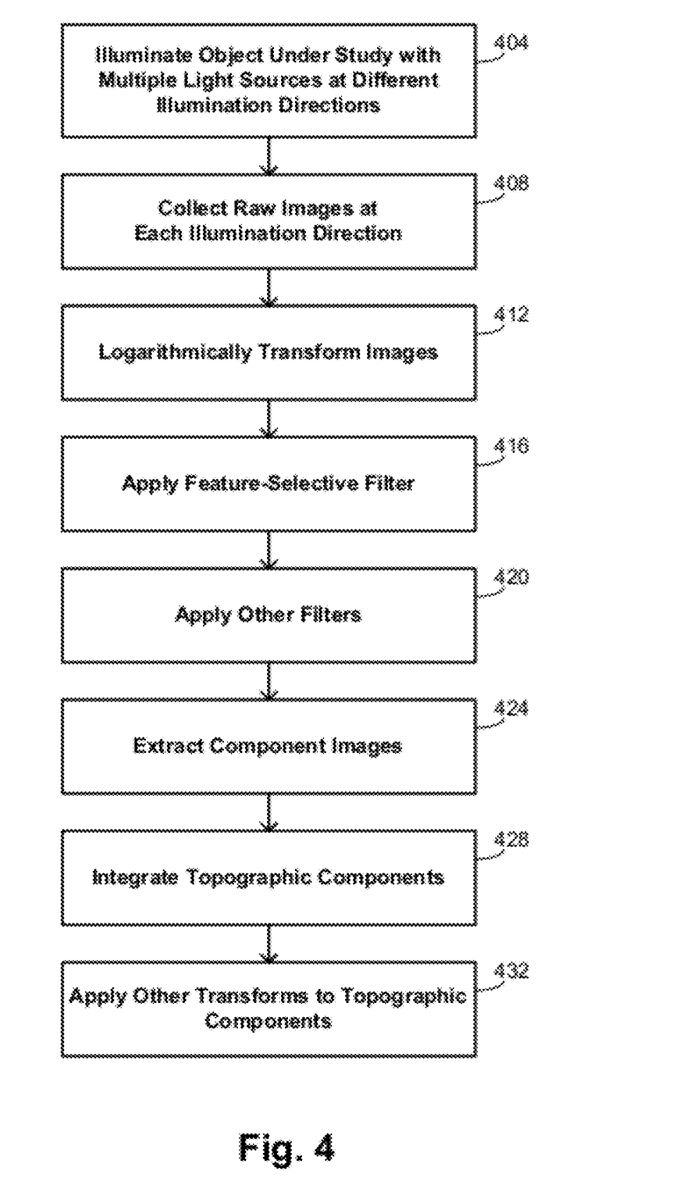
FIG. 4 is a flow diagram that summarizes methods of the invention.

An overview of methods of the invention is provided with the flow diagram of FIG. 4. While the diagram sets forth specific steps in a specific order, this is not intended to be limiting, but rather to illustrate one exemplary embodiment. In other embodiments, some of the specifically identified steps may be omitted, additional steps not explicitly set forth may also be performed, and/or the steps may be performed in an order different than that shown. The ordering of the steps in the exemplary embodiment at times advantageously exploits physically geometrical aspects of the device structure 100 noted above to simplify processing.

The method begins at block 404 by having the object 120 be illuminated using the multiple light sources 104 at different illumination directions. The illumination by the different sources is generally expected to be sequential, particularly in embodiments where each of the light sources 104 is substantially monochromatic at the same wavelength. Raw images are collected at each illumination direction at block 408, forming the raw image dataset from which information about the object 120 is to be extracted.

At block 412, a logarithmic transformation may be applied to the raw image data, thereby converting the raw intensity data to pseudo-absorbance. Different embodiments may use any logarithmic base for the transformation, including both common and natural logarithms. Such a logarithmic transformation to pseudo-absorbance advantageously converts certain multiplicative optical effects to additive optical effects. For example, the albedo, defined as the dimensionless ratio of reflected intensity to incident intensity, combines multiplicatively in raw data space, but combines additively in logarithmic data space.

At block 416, a feature-selective filter is applied, one example of which includes a band-pass filter. Use of a band-pass filter is advantageous when the object 120 is approximately planar, as was noted above is the case when the object 120 is in nominal contact with the platen 112 and can serve to sharpen the image by retaining high-frequency information while reducing low-frequency information. Examples of band-pass filters that may be applied include Laplacian filters, Laplacian-of-Gaussian filters, Difference-of-Gaussian filters, and others. In other cases, the features of interest may comprise mid-range spatial frequencies or low spatial frequencies. For example, the features of interest may be known to have a certain orientation, range of orientations, or set of orientations. In such cases, orientation-selective filters such as Gabor filters, dual-tree complex wavelet filters, and others of the sort may be applied. In other examples, the features of interest may be known to have certain chromatic characteristics, in which case spectrally selective filters may be applied to the images. Other sorts of linear or nonlinear feature-selective filtering can be applied instead of or in conjunction with any of the aforementioned. Application of the feature-selective filter may sometimes be delayed to later in the process shown in FIG. 4. For example, gradient functions or normal vectors may have filtering applied to enforce planarity.

At block 420, other filters may also be applied. In some embodiments, different processing is beneficially applied according to each different illumination condition, one example of which is scatter correction. In cases of biometric applications, for instance, scatter correction may be implemented by recognizing that a portion of light reflected from skin comes from bulk subsurface scattering. At wavelengths in the silicon region, such scattering is anisotropic, with the scattering favoring a forwards direction along the incident illumination line. This scattering anisotropy causes the raw images to include a characteristic blur that varies according to the illumination angle. The effect may be mitigated by applying an appropriate filter such as a deconvolution with an appropriate kernel to the raw images. Each raw image may thus be processed with a kernel appropriate to the illumination condition.

Component images are extracted from the filtered images at block 424. The method of extraction depends on the particular components to be extracted. For example, the albedo may be extracted as a mean of the logarithmic intensities using a constant extraction factor.

Surface gradients that define topographic information may be extracted for an approximately planar object 120 by using periodic factors defined according to system geometry. For example, in an embodiment where the light sources 104 are distributed at constant elevation and uniformly in azimuth over a full 360° angular range, the extraction factor for the x-direction surface gradient $S_x$ may be sinusoidal and the extraction factor for the y-direction surface gradient $S_y$ may be the same in quadrature. The sense (i.e. clockwise or counterclockwise) and the phase of the extraction factors match the device 100 configuration. Definition of other extraction factors according to system geometry will be evident to those of skill in the art, and may include nonsinusoidal factors in some embodiments.

In some embodiments, the extraction factors used to generate the surface gradients $S_x$ and $S_y$ are selected to reduce sensitivity to DC light. This not only reduces the effect of DC ambient lighting around the device 100 on the extraction factors, but also reduces the influence of albedo on the surface-gradient extraction factors. In still other embodiments, the factors also have reduced sensitivity to other nonsynchronous illumination changes, which enhances discrimination against ambient light that fluctuates during sampling. This may be an issue, for example, when the device 100 is deployed in an environment illuminated with fluorescent lighting.

There are multiple ways in which the extraction factors may be selected to meet these different criteria. In some embodiments, extraction factors are defined by a human being to accommodate most commonly expected light conditions in environments where the devices 100 are to be deployed. In other embodiments, devices 100 be more specifically tailored by having different devices that are configured to be suitable for broadly defined categories of lighting conditions: for instance, one configuration of device might be marketed as being suitable for outdoor daytime use, with extraction factors optimized to accommodate bright sunlight and the presence of certain levels of cloud cover; another configuration might be marketed as being suitable for office environments, with extraction factors optimized for fluorescent lighting conditions; and another configuration might be marketed as suitable for dim-light use, with extraction factors that are substantially sinusoidal. In other instances, extraction factors may be defined very specifically for a particular environment by having a human being examine the deployment environment, perhaps performing optical tests of the environment, and deriving appropriate extraction factors.

In still other embodiments, machine-learning techniques as described below may be used to have the device develop extraction factors that are tailored to the deployment environment according to specific data collected while deployed in that environment.

At block 428 of FIG. 4, the extracted topographic components are integrated to generate the topographic image by integrating the surface gradients $S_x$ and $S_y$. The integration is generally carried out numerically using any of a variety of known integration methods such as the Frankot-Chellappa method, methods using shapelets, and the like.

Once the topographic image is generated, other transforms may be applied at block 432, particularly to further modify the resulting topographic image and render it more suitable for subsequent processing. In particular embodiments, the image is modified to change the contrast, to reduce artifacts resulting from specular light, to binarize the image, and the like. Similar to the machine refinement of the topography extraction factors, such transformations may be developed with machine-learning techniques applied to data collected while the device 100 is deployed so that they may be applied to current and future data.

Figure 5:
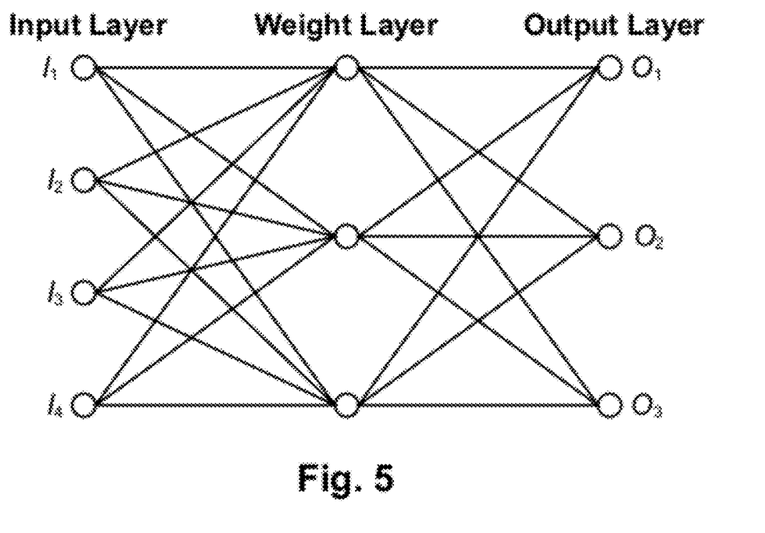
FIG. 5 provides an illustration of a structure of a neural such as may be used in embodiments of the invention.

There are numerous kinds of machine learning that may be implemented in different embodiments. For example, FIG. 5 provides a conceptual illustration of a neural network that may be embodied in the coding of the computational unit 124. A typical neural network includes a plurality of nodes, each of which has a weight value associated with it. The example of FIG. 5 is simplified for purposes of illustration. The network includes an input layer having a plurality of input nodes $I_j$ and an output layer having a plurality of output nodes $O_k$, with at least one layer in between. In the simplified example of FIG. 5, there are four input nodes $I_1$-$I_4$ and three output nodes $O_1$-$O_3$. The activity of the input nodes $I_j$ represents the raw information that is fed into the network and the behavior of the output nodes $O_k$ represents the interpretation drawn by the network. The intermediate layer acts as a weight layer to assign relative weights to the different inputs from the input nodes $I_j$.

For example, in determining an appropriate extraction factor for surface gradients, the nodes of the input layer might correspond to parameters that define the shape of the extraction factor and the nodes of the output layer might correspond to parameters that define the robustness of the calculated surface gradients or of the topographic reconstruction itself. As the system receives feedback, the neural network may reorganize itself, thereby modifying the shape of the extraction factors so that improved topographic reconstructions are derived.

The same technique may be applied as part of the additional transform applications at block 432. In applying a transform to change the contrast of the topographic image, the nodes of the input layer might correspond to parameters defining the characteristics of the contrast transform, with the nodes of the output layer defining the suitability of the resulting contrast. In reducing artifacts due to specular light, the nodes of the input layer might similarly correspond to parameters defining the characteristics of the artifact-reduction transform, with the nodes of the output layer defining a measure of the presence of artifacts in resulting images. Classical neural networks include Kohonen networks, feed-forward networks, and back-propagation networks, each of which use different methods of adjusting the weights and organizing the respective neural network during a training process. This basic structure of a neural network may be applied to any of the further transforms that may be used in different embodiments.

The neural network of FIG. 5 is one example of a broader class of machine-training techniques, any of which may alternatively be used in specific embodiments. For example, expert systems might alternatively be used as a form of machine learning, as may techniques that include stochastic optimization in which the shape of curves (such as may define the extraction factors) are changed in accord with output images by using methods such as steepest descent or simulated annealing. In some embodiments, evolutionary methods may be used by modifying a shape according to genetic algorithms.

In another embodiment, principal-component analysis is used as part of the implementation of machine-learning techniques. Such principal-component analysis may be applied directly to the collected data or may preferably be applied to the data after the logarithmic transformation. Key factors are extracted from the logarithmically transformed data using techniques know to those of skill in the art of principal-component analysis. In one embodiment, the number of key factors is exactly two factors that have zero mean and that are generally insensitive to the effects of DC light. Examples of such factors include sinusoids, but other factors may also be used in other embodiments.

The inventors have observed that improved images can be realized in instances where the illumination has a twofold mirror symmetry about the imaging axis, i.e. in which for every light source 104 at (elevation, azimuth) coordinates, there is a another light source 104 at the mirror coordinates (elevation, azimuth +180°). Possible causes for this symmetry-based improvement are nonideal aspects of the object 120 and imaging, including such aspects as specular changes, refractive-index changes, bulk scatter, and the like.

A further concern in the case of biometric sensing is that many biometric sensors, particularly fingerprint biometric sensors, are prone to being defeated by various forms of spoof samples. In the case of fingerprint readers, for example, a variety of methods are used in which a fingerprint pattern of an authorized user is embedded in some kind of inanimate material such as paper, gelatin, epoxy, latex, or the like. Thus, even if a fingerprint reader reliably determines the presence or absence of a matching fingerprint pattern, the overall security of the system may still be compromised with a mechanism to ensure that the matching pattern is being acquired from a genuine, living finger.

Spoof detection may be accomplished in embodiments of the invention by assessing for dimensionality and/or texture to ensure consistency with genuine samples such as fingers. For instance, in one embodiment, an optical-topographic-imaging system incorporates a plurality of monochromatic optical-topographic-imaging subsystems that operate at different illumination wavelengths, thereby providing chromatic information. The camera 108 may then comprise a color imager and the illumination can be provided as polychromatic light, with the computational unit 124 being configured to analyze the plurality of wavelengths as different monochromatic optical-topographic-imaging subsystems. In a specific implementation, the light sources 104 provide white light with the computational unit 124 being configured to analyze received images as three different monochromatic optical-topographic-imaging subsystems in red, green, and blue.

With this configuration, a genuine sample is characterized by having an object topography that is constant across wavelengths, perhaps after correction for wavelength-dependent changes in bulk scatter, but the albedo will generally be different. The difference in albedo across different illumination wavelengths may accordingly indicate consistency with genuine samples. It is noted that this is also a function that may be enhanced with machine learning by presenting the device 100 with genuine and spoof samples of differing characteristics so that the consistency requirements for discrimination between genuine and spoof samples may be refined according to the machine-learning principles discussed above.

A number of variations to the optical topographic imaging described above may be implemented in various alternative embodiments. One example includes the use of multiplexed illumination. As described above, the light sources 104 may be activated independently and in sequence during a measurement session in some embodiments. In alternative embodiments, multiple of the sources 104, or even all of the sources 104 comprised by the device 100 may be illuminated substantially simultaneously in some pattern, with responses to the individual sources being subsequently derived. Such embodiments allow for the implementation of various transforms such as the Hadamard transform, the Haar transform, and others. Embodiments that use simultaneous multiple-source activation may include greater tolerance to high ambient light levels and increased robustness to object motion during a measurement session.

Other embodiments may include shadow correction when a part of the object 120 is in shadow with respect to one or more illumination conditions. Such shadowing may cause a nonlinear response that can produce artifacts in estimates of the component images. By identifying those regions that are in shadow with respect to a given light source, the factors used to estimate the component images may be modified regionally to exclude shadowed sources. This may be illustrated with an example. Consider an embodiment in which the device 100 has six sources 104. There may accordingly be seven sets of factors used to generate the surface gradients $S_x$ and $S_y$. Each image may be analyzed to determine which source, if any, is most likely to be in shadow over all pixels of the object so that the specific factors are then used with each of the identified regions.

Alternatively, "non-ideal" phenomena such as shadows and sub-surface scattering may be incorporated into the machine-learning process. In particular, situations in which a single class of objects are being measured that manifest similar optical phenomena (though distinctly different topography and/or other characteristics) are well suited to machine-learning methods as described herein. The machine learning may be further facilitated in some cases by having a reference measurement available to act as a "gold standard" that can be used as the goal or objective of the machine-learning algorithm. As an example, the actual topographic features of a set of fingerprints used for training can be established by other measurement methods such as LIDAR, confocal scanning, ultrasound, and a variety of other measurements of the sort. In some cases, precise castings of the fingers in the training set may be made and the topography can then be measured from the castings instead of directly on the fingers. Alternatively, other methods of generating a fingerprint image that are known to be substantially due to finger geometry and relatively unaffected by other optical characteristics may be used to provide a reference image.

In cases in which reference measurements of training data are made by some other technique, an intermediate alignment step might be useful to align the reference data to the OTI data. For example, in the case of fingerprints, each OTI measurement sessions will manifest a particular position (transverse and rotational) as well as plastic deformations that will generally be different than a reference measurement made on the same finger. In such cases, it may be beneficial to align the reference measurement to the OTI measurement. Such alignment can be performed manually, semi-automatically, or fully automatically by a variety of methods known in the art.

In some cases, the salient characteristics of the objects and the OTI system can be simulated. The advantages of doing so are due to the fact that the actual reference values for the simulated objects (as well as the illumination and imaging systems) are necessarily known and require no second measurement or alignment of the reference and measurement values. Such simulations should be physically accurate in order to be directly applicable to the physical measurement system. In some cases, commercially available 3D rendering software packages have been found by the inventors to provide a good means to perform simulations with the required degree of fidelity to the real systems.

The inventors have found that the combination of several aspects of the invention as described herein combine synergistically to enable more versatile and effective imaging for objects that manifest some number of specific optical phenomena. These aspects include the stability of the imaging-system geometry relative to the object location, the ability to identify a characteristic of multiple objects that may be used in defining a class of objects, and the application of machine learning under those conditions. In particular, objects being imaged manifest some number of the following optical phenomena: diffuse (Lambertian) reflectance; specular reflectance; reflectance differences as a function of spatial position; subsurface scattering in which light penetrates the surface of the object and interacts with material below the surface before passing from the object into the imaging system; inter-reflections in which illumination light undergoes two or more distinct interactions before being acquired by the imaging system (e.g., the light reflects from one part of the object onto a second part of the object and then enters the imaging system); and shadowing in which the topographic features of the object block illumination light from reaching other portions of the object.

In addition, further analytic complexity occurs when objects are imaged by systems having one or more of the following characteristics: the object is illuminated with near-field light sources, which results in illumination angles and/or illumination intensities that vary across the field of view; and/or the object of interest is being imaged through a transparent or partially transparent medium (the "platen") such as glass or plastic, and the object variously is or is not in contact with the platen, depending on object topography. When only portions of the object are in contact with the platen, the refraction at the object surface will generally vary between the points of the object in contact with the platen and those points not in contact with the platen.

Embodiments of the invention advantageously provide methods and devices capable of addressing situations in which a significant number of the optical phenomena and imaging conditions are present and interact in complex ways. This is in contrast to other techniques that can extract reflectance and/or topographic information when only a very limited number of these phenomena are present. For example, methods such as photometric stereo and stereo imaging can be effective for imaging diffusely reflecting objects and can sometimes accommodate a degree of specular reflection. Shape-from-shading is a method that can infer object geometry from shadows, and shape-from-specular is a method that can extract estimates of object geometry from specular reflections. Methods and devices of the invention are particularly applicable to classes of measurements in which the following are true: the topographic features of interest on the object are small compared to the macro geometry (e.g., the object is "2.5 dimensional" or substantially planar with small features relative to the overall dimensions); the topographic measurements are intended to be performed on a single class of objects that manifest substantially similar optical characteristics, though the objects themselves may be distinct (e.g., fingerprints); and/or the geometry of the optical system and its relationship with the objects of interest are known and substantially fixed across the measurements being made.

With this combination of aspects, information obtained from the imaging is more reliable, more repeatable, and contains greater information content.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of studying a predefined portion of an object having a feature of interest and that is of a class of objects that each have a substantially similar optical property, the method comprising:

activating each of a plurality of light sources to directly illuminate the object, wherein each of the plurality of light sources provides illumination from a different illumination direction and wherein the plurality of light sources is maintained in a stable configuration relative to the object;

for each illumination direction, generating an image from light scattered from the object with a camera maintained in a stable configuration relative to the plurality of light sources;

applying a methodology derived from machine learning for the class of objects to:

filter the generated images for each illumination direction for a characteristic consistent with the feature of interest;

determine surface gradients for the object from the filtered images for each illumination direction taking into account a system geometry defining each said illumination direction, wherein determining the surface gradients comprises extracting the surface gradients through application of periodic factors generated as a function of a geometry defined by positions of the plurality of light sources relative to the object; and integrate the surface gradients to generate a topography of a surface of the predefined portion of the object.

2. The method recited in claim 1 further comprising determining an albedo of the surface of the object from the generated images.

3. The method recited in claim 1 wherein:

the predefined portion of the object is approximately planar; and filtering the generated images comprises applying a bandpass filter to the generated images.

4. The method recited in claim 1 wherein:
the feature of interest comprises an orientation; and
filtering the generated images comprises applying an orientation filter to the generated images.

5. The method recited in claim 1 wherein:
the feature of interest comprises a chromatic characteristic; and
filtering the generated images comprises applying a chromatic filter to the generated images.

6. The method recited in claim 1 wherein determining the surface gradients comprises applying a deconvolution to the generated images to account for anisotropic scattering of light by a bulk component of the object.

7. The method recited in claim 1 wherein the topography of the surface of the object is defined by a topographic image, the method further comprising applying a transformation to the topographic image.

8. The method recited in claim 7 wherein the transformation changes a contrast of the topographic image.

9. The method recited in claim 7 wherein the transformation reduces artifacts due to specular light within the topographic image.

10. The method recited in claim 7 wherein the transformation binarizes the topographic image.

11. The method recited in claim 1 wherein the light sources are substantially monochromatic light sources.

12. The method recited in claim 11 wherein each of the light sources generates light at substantially the same wavelength.

13. The method recited in claim 1 wherein the light sources are distributed about the object at substantially the same elevation and are distributed substantially uniformly in azimuth relative to the object.

14. The method recited in claim 1 wherein portions of the object are in optical contact with a platen that is substantially transparent to light generated by the light sources.

15. The method recited in claim 1 wherein:
the light sources provide light at a plurality of wavelengths; and
determining the surface gradients for the object comprises determining surface gradients for the object at each of the plurality of wavelengths.

16. The method recited in claim 15 wherein at least some of the light sources comprise polychromatic light sources.

17. The method recited in claim 15 further comprising:
determining an albedo of the surface of the object from the generated images at each of the plurality of wavelengths; and
comparing the determined albedo at the plurality of wavelengths to determine an authenticity of the object as a biometric sample.

18. The method recited in claim 1 wherein the object comprises a biometric sample.

19. The method recited in claim 1 wherein the object comprises a machined barcode.

20. The method recited in claim 1 wherein directly illuminating the object with the plurality of light comprises sequentially activating the light sources.

21. The method recited in claim 1 wherein activating each of the plurality of light sources comprises simultaneously activating at least some of the plurality of light sources in a pattern to determine a response to individual light sources with a transform.

22. The method recited in claim 1 wherein determining surface gradients for the object from the generated images comprises regionally modifying at least one of the generated images to exclude a shadowed portion of the object.

23. A device for studying a predefined portion of an object having a feature of interest and that is of a class of objects that each have a similar optical property, the device comprising:
a plurality of light sources disposed to provide illumination of the object from different illumination directions, wherein the plurality of light sources is maintained in a stable configuration relative to the object;
a camera disposed to receive light scattered from the object, wherein the camera is maintained in a stable configuration relative to the plurality of light sources; and
a computational unit in communication with the plurality of light sources and with the camera, the computational unit having:
instructions to activate the light sources to directly illuminate the object;
instructions to operate the camera in concert with activation of the light sources to generate an images of the object for each of the illumination directions; and
instructions to apply a methodology derived from machine learning for the class of objects to:
filter the generated images for each illumination direction for a characteristic consistent with the feature of interest;
determine surface gradients for the object from the filtered images for each illumination direction taking into account a system geometry defining each said illumination direction, wherein determining the surface gradients comprises extracting the surface gradients through application of periodic factors generated as a function of a geometry defined by positions of the plurality of light sources relative to the object; and
integrate the surface gradients to generate a topography of a surface of the predefined portion of the object.

* * * * *